United States Patent [19]

Fujino

[11] Patent Number: 4,945,365
[45] Date of Patent: Jul. 31, 1990

[54] CAMERA CAPABLE OF INPUTTING AND OUTPUTTING SIGNALS BETWEEN IT AND EXTERNAL DEIVCE THROUGH FILM SENSITIVITY READING MATERIALS

[75] Inventor: Akihiko Fujino, Osaka, Japan

[73] Assignee: Minolta Camera Kabushiki Kaisha, Osaka, Japan

[21] Appl. No.: 350,229

[22] Filed: May 11, 1989

[30] Foreign Application Priority Data

May 16, 1988 [JP] Japan .................................. 63-118627

[51] Int. Cl.$^5$ ............................................... G03B 7/00
[52] U.S. Cl. ......................................... 354/21; 354/412
[58] Field of Search ................ 354/21, 410, 412, 289.1

[56] References Cited

U.S. PATENT DOCUMENTS

| | | | |
|---|---|---|---|
| 4,423,934 | 1/1984 | Lambeth et al. ..................... | 354/412 |
| 4,676,616 | 6/1987 | Hoda et al. ........................... | 354/21 |
| 4,692,005 | 9/1987 | Takami .................................. | 354/21 |

FOREIGN PATENT DOCUMENTS 62-7038 1/1987 Japan .

*Primary Examiner*—L. T. Hix
*Assistant Examiner*—David M. Gray
*Attorney, Agent, or Firm*—Burns, Doane, Swecker & Mathis

[57] ABSTRACT

A camera capable of inputting and outputting adjusting signals between it and a camera adjusting device by utilizing film sensitivity reading terminals for reading the film sensitivity recorded on a film cartridge. In the camera control circuitry there is provided a circuit for judging whether it is the camera adjusting device or a film cartridge that is connected to the film sensitivity reading terminals, whereby when it is judged that the camera adjusting device is connected to the terminals, the camera mode is set to a camera adjusting mode to input and output adjusting signals between the camera and the camera adjusting device, while when it is judged that a film cartridge is connected to the terminals, the camera mode is set to a normal mode to read the film sensitivity into the camera.

4 Claims, 3 Drawing Sheets

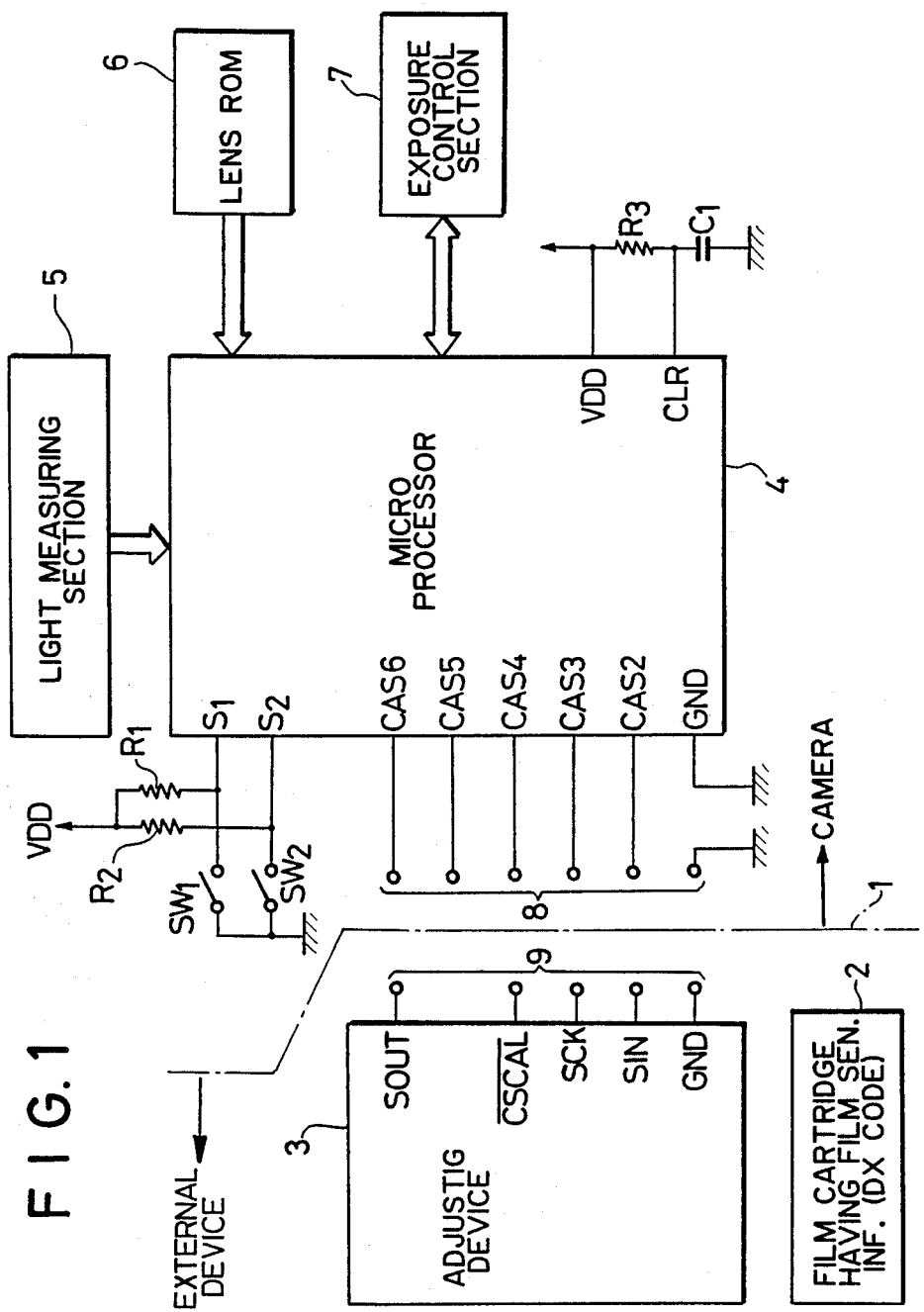
F I G. 1

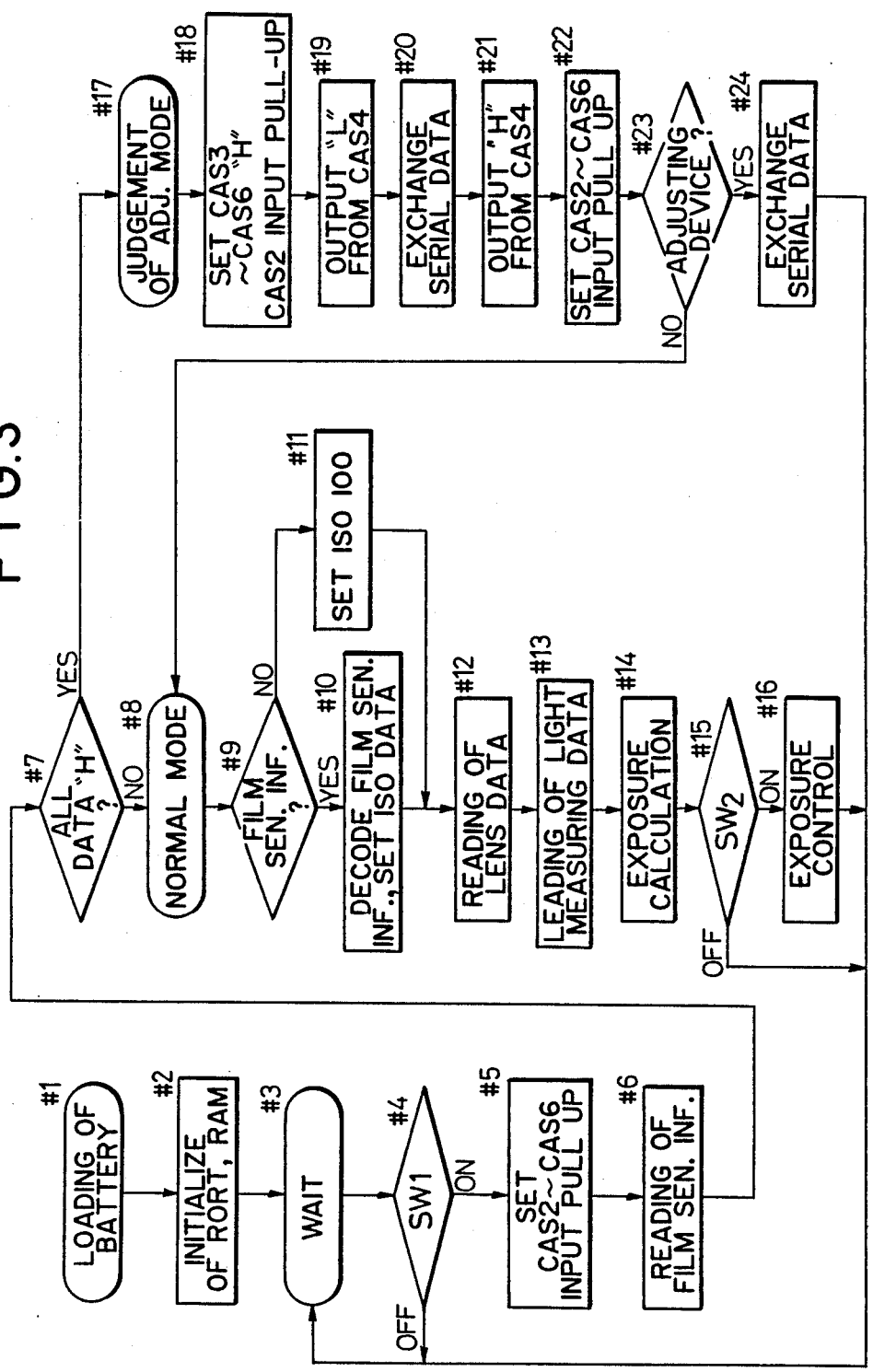

CAMERA CAPABLE OF INPUTTING AND OUTPUTTING SIGNALS BETWEEN IT AND EXTERNAL DEIVCE THROUGH FILM SENSITIVITY READING MATERIALS

BACKGROUND OF THE INVENTION

1. Field of the Invention

The present invention relates to a camera capable of inputting and outputting signals between it and an external device which is used for the adjustment of camera, for example, in a camera manufacturing process.

2. Description of the Prior Art

In a camera manufacturing process, adjusting signals are input and output between a camera and an adjusting device to adjust the camera. In this connection, it is known to effect such signal input and output by the utilization of film sensitivity reading terminals which are provided for reading a film sensitivity encoded on a periphery of a film cartridge, without providing any special terminal. However, if a signal for communication with the exterior should be outputted by mistake from a film sensitivity reading terminal when a film cartridge having information on the film sensitivity is loaded in the camera, there will occur a short-circuit or a data read. To avoid this, it is proposed in Japanese Patent Laid Open Publication No. Sho 62-7038 and U.S. Pat. No. 4,692,005 to provide separate terminals to discriminate between the case where a conventional film sensitivity reading terminal is used for input only as in normal film sensitivity reading and the case where is used for the input and output of signals between it and the adjusting device.

However, the addition of such separate terminals results in an increase in the camera production cost.

SUMMARY OF THE INVENTION

It is a primary object of the present invention to provide a camera capable of inputting and outputting of signals between it and an external device such as an adjusting device by the utilization of already-provided film sensitivity reading terminals without providing additional terminals.

Other objects of the present invention will become apparent from the following detailed description taken in connection with the accompanying drawings.

BRIEF DESCRIPTION OF THE DRAWINGS

FIG. 1 is a diagram of a control circuit used in the camera of the present invention;

FIG. 3 is a flowchart showing the sequence of controlling operations of the camera.

DETAILED DESCRIPTION OF THE PREFERRED EMBODIMENT

Figure 2:
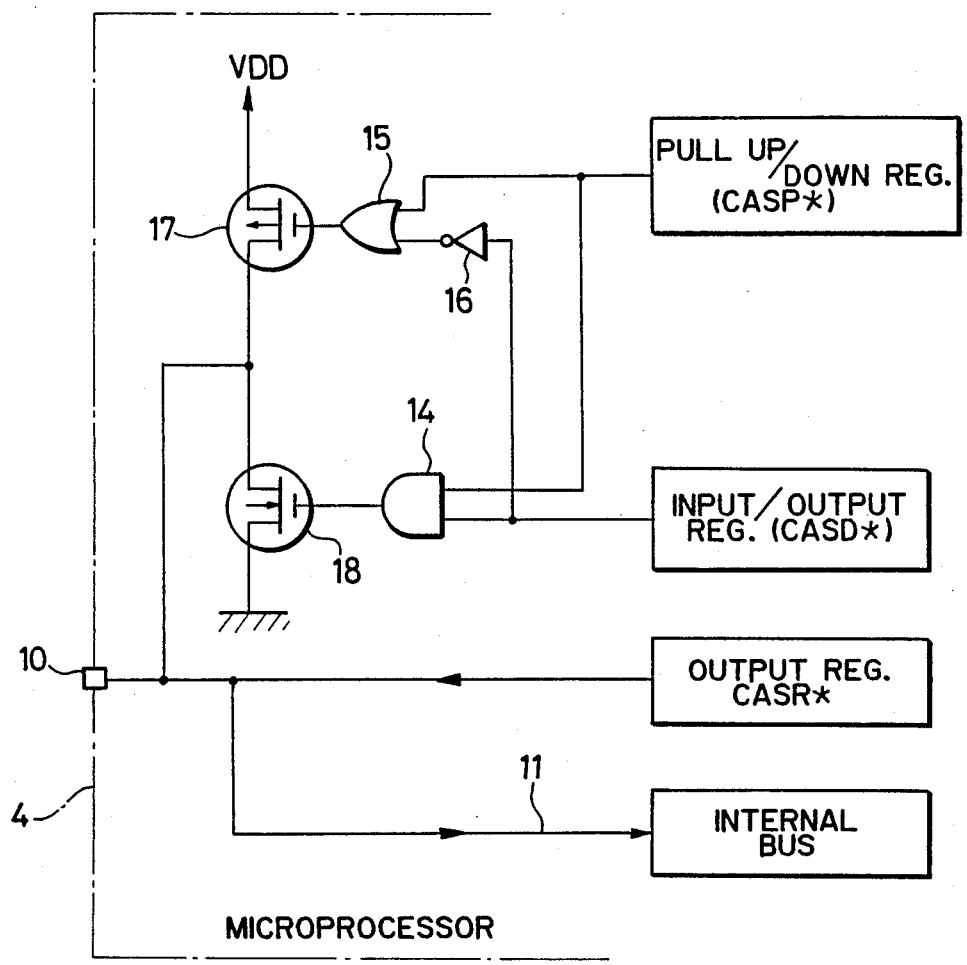
FIG. 2 is a circuit diagram showing a principal portion of the control circuit.

The present invention will now be described on the basis of an embodiment thereof. FIG. 1 is a block diagram showing a control circuit used in the camera of the present invention. On the left-hand side of a chain line 1 there is mounted a film cartridge 2 or a camera adjusting device 3 in a film cartridge chamber.

The control circuit, comprising a microprocessor 4, receives information from a light measuring section 5 and also from a ROM 6 mounted in an interchangeable lens attached to the camera, and performs exposure control through the exchange of signals with an exposure control section 7.

When electricity is supplied to a terminal VDD, a positive edge is fed to a terminal CLR and the microprocessor 4 starts to perform predetermined operations. A terminal GND is a ground terminal and terminals CAS2 to CAS6 form a group of terminals serving as both parallel input terminals for reading film sensitivity and terminals for serial communication with the adjusting device 3. Numeral 8 represents a group of contact pieces corresponding to the group of terminals. The contact pieces 8 come into contact with the film cartridge 2 to read film sensitivity information and are brought into connection with a group of contact pieces 9 of the adjusting device 3 to make input and output of signals for adjustment. In the adjusting device 3, terminals SOUT, CSCAL, SCK, SIN and GND represent serial data output terminal, control signal input terminal, clock pulse input terminal, serial data input terminal, and ground terminal, respectively. The terminals CAS6 to CAS2 and GND of the microprocessor, during input and output of adjusting signals between them and the adjusting device, are changed over to functions corresponding to the terminals of the adjusting device 3.

$S_1$ and $S_2$ denote interrupt terminals connected to a main switch $SW_1$ and a release switch $SW_2$, respectively, which are interlocked respectively with release buttons.

FIG. 2 shows a signal input/output control section incorporated in the microprocessor 4 and connected to the terminals CAS2–CAS6 of the microprocessor. Since the circuits connected to the terminals CAS-2–CAS6 are the same, only one of them is here shown. The mark * represents Nos. 2 to 6 corresponding to the terminal Nos. 2 to 6.

In FIG. 2, the numeral 11 denotes an internal bus in the microprocessor 4. Serial signals inputted from the terminal CAS* are fed through the bus 11 to a register, etc. in the microprocessor 4. Numerals 14, 15 and 16 denote an AND circuit, an OR circuit and an inverter, respectively; and numeral 17 denotes a field effect transistor for switching. CASP*, CASD* and CASR* represent a pull up/down register, an input/output direction register, and an output register, respectively. These registers CASP*, CASD* and CASR* are controlled by programs held in the microprocessor 4.

Table 1 below shows the state of port of the terminal CAS* which is determined according to whether the signal levels of the pull up/down register CASP*, input/output direction register CASD* and output register CASR* are "1" or "0". The mark "-" appearing in the same table indicates that the signal level is not considered.

TABLE 1

| CASR* | CASD* | CASP* | STATE OF PORT (CAS*) |
|---|---|---|---|
| — | 0 | 1 | Input, Pull-Up |
| — | 0 | 0 | Input, Pull-Down |
| 1 | 1 | — | Output "H" |
| 0 | 1 | — | Output "L" |

FIG. 3 is a flowchart showing operations of the microprocessor 4. Upon loading of a battery to supply an electric power VDD, the microprocessor starts operation from step #1, then in step #2, Port and RAM are initialized. Steps #3 and #4 are flows waiting for turning ON of the switch SW$_1$. In step #5, the registers CASD* and CASP* are set to 0 and 1, respectively, and all the ports of the terminals CAS2 to CAS6 are set to Input, Pull-Up, now ready for parallel read of film sensitivity information, which is then executed in setp #6. Then, in step #7, judgment is made as to whether the read data are all "H" or not at the terminals CAS2 to CAS6.

If the answer is negative in step #7, then in step #8, the camera mode is set to a normal mode for photographing. In step #9, judgment is made as to whether film sensitivity information is present or not, and if the answer is affirmative, then in step #10 an automatic setting of ISO data on the basis of that information is made, while if the answer is negative, ISO 100 is set in step #11. Then, in steps #12 and #13 there are read data from the lens ROM 6 and subsequently from the light measuring section 5. Further, in step #14 there is performed exposure calculation. Now judgment is made as to whether SW$_2$ is ON or not in step 15, and if the answer is affirmative, execution passes from release of shutter to exposure control in step 16, while if the answer is negative, execution returns to step #3.

On the other hand, if in step #7 it is detected that all of the read data on film sensitivity are "H", execution shifts to step #17 to judge whether the operation mode is an adjusting mode or not. More particularly, that all of the read data are "H" in step #7 is considered to indicate that the camera is not loaded with a film cartridge, or loaded with a film cartridge not having film sensitivity information, or connection is made to the adjusting device. So in the steps which follow step #17 there is made judgment whether connection is made to the adjusting device. First, in step #18, the terminals CAS3 to CAS6 are set to Output "H" and the terminal CAS2 is set to Input Pull-Up, thereby changing over the terminals CAS6-CAS2 to serial data exchange use. Then, an "L" signal is outputted from the terminal CAS4 and subsequently in step #20 there is performed a serial data exchange for judging whether the adjusting device is connected. If the adjusting device is connected, the discrimination data are read into the camera. In step #21 an "H" signal is provided to the terminal CAS4 to terminate the exchange of data, then in step #22 all the terminals CAS6-CAS2 are returned to the state of Input Pull-UP. In step #23 there is made discrimination of the data obtained in the serial data exchange of step #20 and if the adjusting device is judged to be connected, execution passes to step #24, wherein the operation is set to the camera adjusting mode, starting serial data exchange of adjusting signals. More specifically, in step #24, execution goes through the same procedures as in step #18, #19, #21 and #22 and there is performed adjusting data exchange in the step corresponding to step #20. When this is over, execution returns to step #3. If in step #23 it is impossible to confirm that the adjusting device is connected, this means that the camera is not loaded with a film cartridge or loaded with a cartridge not having film sensitivity information, so execution shifts to step #8 to start the normal mode operation.

Thus, whether the adjusting device is connected or not is judged by trying the exchange of data through the terminals CAS6-CAS2. This trial is limited to the case where all of the terminals CAS6-CAS2 are "H" in step #7, that is, limited to the case where the camera is not loaded with a film cartridge having film sensitivity information. Therefore, in the exchange of data performed when the camera is loaded with a cartridge having film sensitivity information, there is no fear of a short-circuit or reading of erroneous data.

According to the present invention, as set forth hereinabove, it not only becomes possible to make adjustment by utilizing contact pieces for reading film sensitivity, but also, without increasing the number of terminals, it is possible to prevent the occurrence of accidents such as a short-circuit and reading of erroneous data.

Having described our invention as related to the embodiment shown in the accompanying drawings, it is our intention that the invention be not limited by any of the details of description, unless otherwise specified, but rather be construed broadly within its spirit and scope as set out in the accompanying claims.

What is claimed is:

1. A camera which input and outputs signals between the camera and an external device through a plurality of film sensitivity reading terminals, said camera including;

film sensitivity reading means connected to said film sensitivity reading terminals, signal input and output means connected to at least one of said reading terminals for the input and output of signals between said reading terminals and the external device; and control means which activates said signal input and output means only when the camera is judged to be not loaded with a film cartridge having film sensitivity information responsive to an analysis of signals transmitted through said reading terminals and read by said film sensitivity reading means.

2. A camera according to claim 1, having two modes comprising a camera adjusting mode and a normal operation mode, wherein said control means sets the camera mode to the camera adjusting mode when it is judged that the external device is connected to the film sensitivity reading terminals, while said control means sets the camera mode to the normal mode when it is judged that the external device is not connected to the film sensitivity reading terminals.

3. A camera according to claim 1 or claim 2, wherein said signal inputting and outputting means inputs and outputs information signals composed of plural bits as serial signals.

4. A camera according to claim 1, wherein means for judging whether or not said reading terminals are in an open state, means for controlling said signal input and output means to output serial data through said reading terminals responsive to said means for judging when it is judged that the terminals are in an open state, and means for subsequently executing serial data exchange between the camera and the external device when serial data is input from the external device in response to the serial data output from said input and output means.

* * * * *